(No Model.) 2 Sheets—Sheet 1.

C. F. ELMES.
FLUID MOTOR.

No. 486,095. Patented Nov. 15, 1892.

Witnesses:
O. F. Rossiter
John L. Jackson

Inventor:
Charles F. Elmes
By Bond Adams & Pickard
Attorneys (No Model.) 2 Sheets—Sheet 2.

C. F. ELMES.
FLUID MOTOR.

No. 486,095. Patented Nov. 15, 1892.

Witnesses:
H. Rossiter
John L. Jackson

Inventor
Charles F. Elmes.
By Bond Adams Pickard
Attorneys

UNITED STATES PATENT OFFICE.

CHARLES F. ELMES, OF CHICAGO, ILLINOIS.

FLUID-MOTOR.

SPECIFICATION forming part of Letters Patent No. 486,095, dated November 15, 1892.

Application filed March 12, 1892. Serial No. 424,653. (No model.)

*To all whom it may concern:*

Be it known that I, CHARLES F. ELMES, a citizen of the United States, residing at Chicago, in the county of Cook and State of Illinois, have invented certain new and useful Improvements in Fluid-Motors, of which the following is a specification, reference being had to the accompanying drawings, in which—

Figure 1:
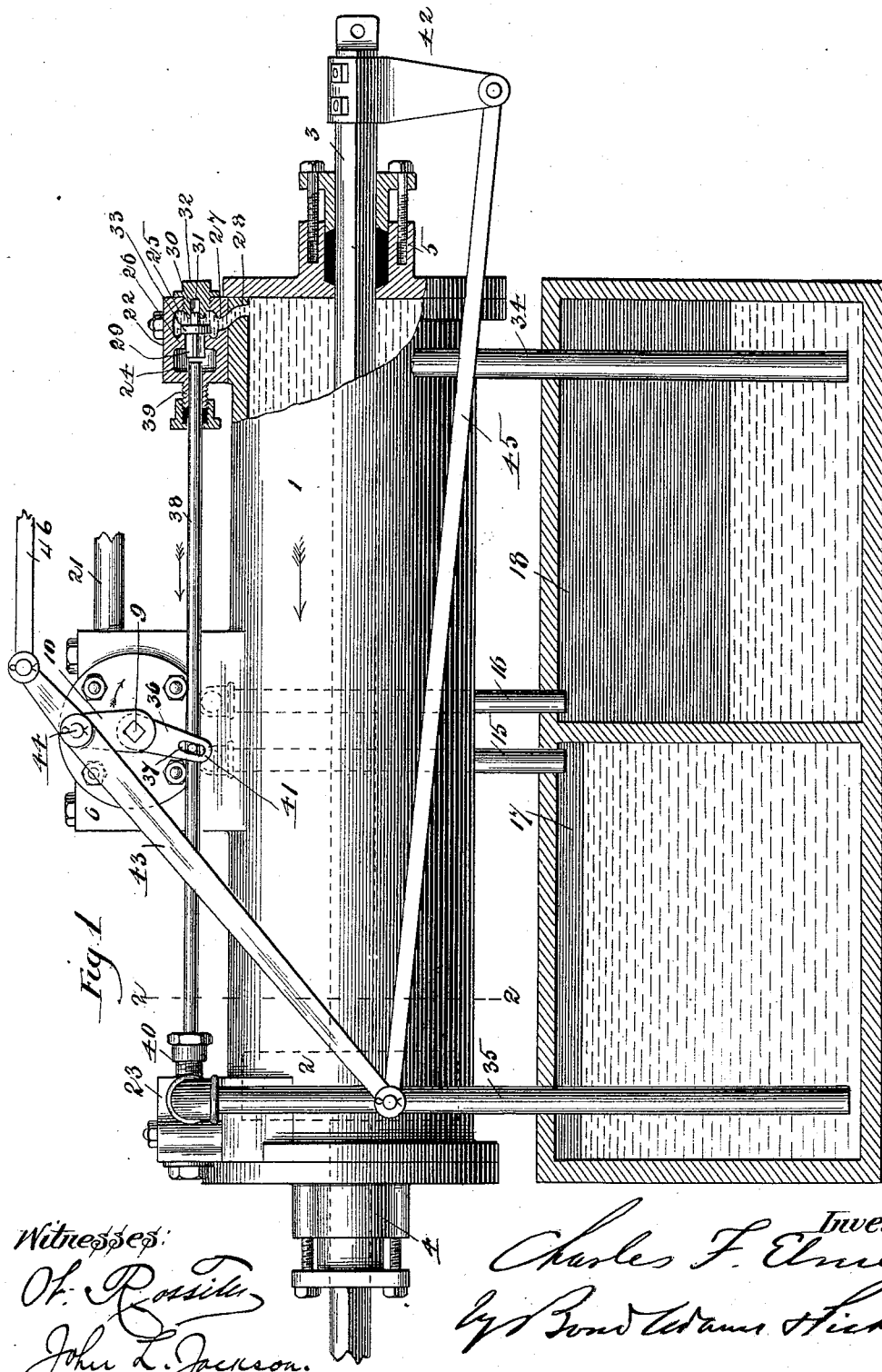
Figure 2:
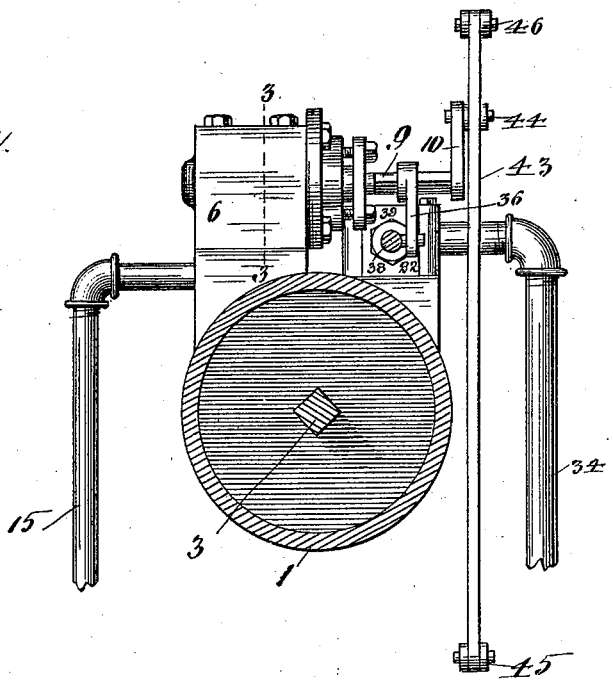
Figure 3:
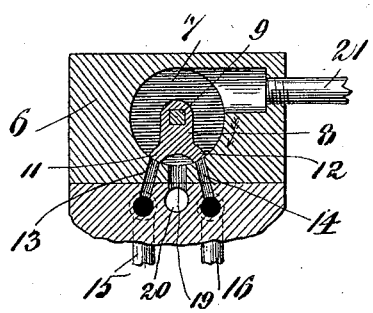

Figure 1 is a side elevation, some parts being in section. Fig. 2 is a vertical cross-section on line 2 2 of Fig. 1; and Fig. 3 is a longitudinal vertical section on line 3 3 of Fig. 2.

My invention relates to fluid-motors particularly designed for use in connection with the steering apparatus of vessels, but useful for other purposes.

The object of my invention is to provide a new and improved fluid-motor the action of which will be smooth and uniform and which may be accurately controlled and operated. I accomplish this object as hereinafter specified and as illustrated in the drawings.

That which I regard as new will be pointed out in the claims.

In the drawings, 1 indicates a cylinder, in which is fitted a solid piston-head 2, mounted upon a piston-rod 3. The piston-rod 3 is preferably square in cross-section and extends entirely through the cylinder 1, suitable stuffing-boxes 4 and 5 being provided at opposite ends of the cylinder, as shown in Fig. 1. Mounted centrally upon the cylinder 1 is a valve-casing 6, in which is a valve-chamber 7 and a valve 8, as best shown in Fig. 3. The valve 8 is mounted upon a stem 9, which extends to the outside of the casing, as shown in Fig. 1, and is provided with a lever 10, by means of which it may be rotated. The valve 8 is provided with two downwardly-projecting arms 11 and 12, which project from the body of the valve at an angle to each other, as best shown in Fig. 3, and are adapted to fit closely over ports 13 and 14, respectively, as shown, to open and close said ports. The operation of the valve 8 is such that by rotating the stem 9 the arms 11 and 12 may be moved to open or close the ports 13 and 14.

15 16 indicate two pipes, which are in communication with the outer ends of the ports 13 and 14, respectively, as shown in Fig. 3. The pipe 15 opens into the upper part of a reservoir 17 and the pipe 16 opens into the upper part of a reservoir 18, as shown in Fig. 1. The reservoirs 17 and 18 are suitably located near the cylinder 1, preferably underneath it, and are each of sufficient capacity to contain as much fluid—such as water—as the cylinder 1, for purposes which will be explained more fully hereinafter.

19 indicates an exhaust-port which opens into the chamber 7 between the ports 13 and 14 and communicates with an exhaust-pipe 20, through which a working fluid—such as steam—is exhausted from the reservoirs 17 and 18.

21 indicates a steam-pipe adapted to conduct steam into the chamber 7.

22 23 indicate valve-casings which are mounted upon the cylinder 1 at opposite ends, as best shown in Fig. 1. In the valve-casing 22 are two chambers 24 and 25, separated from each other by a partition 26, as best shown in Fig. 1. The chamber 25 is provided with a port 27, which connects with a passage 28, leading from the adjacent end of the cylinder 1 to said port, as best shown in Fig. 1.

29 indicates a check-valve which is seated in a suitable opening in the partition 26, as shown in Fig. 1. The valve 29 is provided with a pin 30, adapted to fit into a suitable socket 31, formed in a plug 32, which is adapted to be screwed into the end of the valve-casing 22, as best shown in Fig. 1. The pin 30 and plug 32 serve to hold the valve 29 in proper position.

33 indicates a shoulder formed on the outer end of the valve 29, which shoulder is adapted to rest upon the partition 26 to prevent the passage of water from the chamber 25 to the chamber 24 when the valve is in the position shown in Fig. 1. The casing 23 is provided with a valve and chambers the exact counterpart of those contained in the casing 22.

34 indicates a pipe which extends from the chamber 24 in the casing 22 to the bottom of reservoir 18, as shown.

35 indicates a pipe which extends from the chamber in the casing 23, which corresponds to the chamber 24 in the casing 22 to the bottom of the reservoir 17.

36 indicates a lever which is rigidly connected to the stem 9 and extends downward and is provided with a slot 37, as shown in Fig. 1. Instead of connecting the lever 36 to the stem 9 it may be connected to the lever 10.

38 indicates a horizontal rod which passes through stuffing-boxes 39 and 40, formed in the ends of the casings 22 and 23, respectively, and terminates opposite the valves in said casings, as shown in Fig. 1. The length of the rod 38 is such that it will just fit between the ends of the check-valves in the casings 22 and 23 when said valves are resting in their seats, as in the position shown in Fig. 1.

41 indicates a pin which projects from the rod 38 and fits into the slot 37 in the lever 36, as shown in Fig. 1.

42 indicates an arm which is connected to and projects from the piston-rod 3 near one end, as shown in Fig. 1. The length of the arm 42 is somewhat greater than the radius of the cylinder 1, as shown.

43 indicates a lever which is fulcrumed upon a pin 44, which projects from the lever 10 near one end, as shown in Fig. 1. The lower end of the lever 43 is pivoted to a connecting-rod 45, the other end of which is pivoted to the arm 42, as shown in Fig. 1. The upper end of the lever 43 is preferably connected to a controlling or operating rod 46; but in the different uses to which my improved brake is adapted the lever 43 may be connected to different controlling mechanism.

The operation of my improved brake is as follows: When the valve 8 is in the position shown in Fig. 3, both ports 13 and 14 will be closed and steam will be prevented from entering either the pipe 15 or the pipe 16, and the piston 2 will consequently remain stationary. When the valve 8 is turned in the direction indicated by the arrow in Fig. 3, (which is accomplished by turning the lever 10 in the direction indicated by the arrow in Fig. 1,) the port 14 will be opened to admit steam from the chamber 7 into the pipe 16, while the port 13 will be thrown into communication with the port 19, which leads to the exhaust-pipe 20. Steam will consequently pass from the chamber 7 through the pipe 16 into the reservoir 18, which will be full of water. The steam-pressure will force the water from the reservoir 18 upward to the pipe 34 into the chamber 24 in the casing 22. The pressure of the water will force the valve 29 out of its seat, and the water will therefore be permitted to flow into the chamber 25 and thence through the ports 27 and 28 into the cylinder 1, forcing the piston 2 in the direction indicated by the arrow in Fig. 1. The water on the opposite side of the piston-head 2 will at the same time pass upward through the port in the opposite end of the cylinder into the chamber in the casing 23, which corresponds to the chamber 25 in the casing 22. The movement of the lever 10, as indicated, will have moved the lever 36 in a similar direction, thereby moving the rod 38 in the direction indicated by the arrow in Fig. 1, thereby causing the end of the rod which projects into the casing 23 to come in contact with the end of the valve in said casing, causing it to move out of its seat. The water will thereby be permitted to flow through the chambers in the casing 23 into the pipe 35, whence it will pass into the reservoir 17. Any uncondensed steam which may remain in the chamber 7 will be forced upward through the pipe 15 and into the exhaust-pipe 20, owing to the position of the valve 8. The movement of the valve 8 in the opposite direction will cause a reversal of the operations of the valves and a reverse movement of the piston. From the manner of connecting the lever 10 with the piston-rod 3 through the connecting-rod 45 and lever 43 when the lever 10 is moved to permit steam to flow into either of the pipes 15 or 16 the motion of the piston-rod will act through the connecting-rod 45 and lever 43 to return the lever 10 to its former position, and thereby close the ports 13 and 14 and shut off steam. In order to cause the piston-rod 3 to move continuously, it is necessary that the lever 10 be moved out of its normal position and held out of such position. This constructions renders the brake especially desirable for use in connection with steering apparatus of vessels, for the reason that the piston-rod may be readily locked at any desired point and it may be very readily started in one direction or reversed.

That which I claim as my invention, and desire to secure by Letters Patent, is—

1. The combination, with a cylinder, a piston operating therein, and pipes for conducting a fluid into or out of said cylinder at each end, of check-valves at opposite ends of the cylinder for normally preventing the flow of the fluid therefrom, means for forcing the fluid into either end of the cylinder to operate the piston, and devices for operating said valves, whereby the fluid may be permitted to escape from either end of the cylinder, substantially as described.

2. The combination, with a cylinder, a piston operating therein, and pipes for conducting a fluid into or out of said cylinder at each end, of check-valves at opposite ends of the cylinder for normally preventing the flow of the fluid therefrom, means for forcing the fluid into either end of the cylinder to operate the piston, devices for operating said valves, whereby the fluid may be permitted to escape from either end of the cylinder, and mechanism operated by the motion of the piston for effecting the closing of said valves, substantially as described.

3. The combination of a cylinder having check-valves at its opposite ends, a piston adapted to move in the cylinder, water-reservoirs, pipes for conducting water from the reservoirs into opposite ends of the cylinder, steam-pipes for introducing steam into the reservoirs, a steam-valve for controlling the admission of steam to the reservoirs, and devices actuated by the piston-rod for operating the steam and check valves, substantially as described.

4. The combination, with a cylinder, a piston-rod, and a piston adapted to move in said cylinder, of water-reservoirs, pipes for conducting water therefrom into the cylinder at opposite ends, steam-pipes for introducing steam into said reservoirs, a valve-chamber 7, ports 13 and 14, communicating with said steam-pipes, a rotary valve 8 in said chamber, adapted to open and close said ports 13 and 14, stem 9, carrying said valve 8 and projecting to the outside of said valve-chamber, a lever 10, carried by said rod, lever 43, connected to said lever 10, arm 42, connected to said piston, and connecting-rod 45, connecting said arm 42 with the lever 43, whereby the motion of the piston will act through the lever 43 to normally return the valve 8 to such position as to close the ports 13 and 14 and thereby cut off steam from the steam-supply pipes, substantially as and for the purpose specified.

5. The combination, with a cylinder 1, a piston-rod, and piston adapted to move therein, of water-reservoirs 17 and 18, valve-casing 22, mounted upon said cylinder at one end, chambers 24 and 25 in said casing, check-valve 29, adapted to permit the flow of water from the chamber 25 to the chamber 24, ports 27 and 28 for affording communication between the chamber 25 and the interior of the cylinder, pipe 34, adapted to conduct water from the reservoir 18 to the chamber 24, valve-casing 23 upon the opposite end of the cylinder 1, check-valve and chambers in said valve-casing 23, similar to the check-valve and chambers in the casing 22, pipe 35, steam-supply pipes 15 and 16, valve-chamber 7, ports 13 and 14 in said valve-chamber, affording communication between the pipes 15 and 16 and said chamber, exhaust-port 19, rotary valve 8, mounted in said chamber 7 and adapted to be operated to open and close the ports 13 and 14, steam-supply pipe 21, stem 9, projecting to the outside of said chamber 7, lever 36, carried by said stem 9, rod 38, extending into the valve-casings 22 and 23 and adapted to engage the check-valves contained in said casings, said rod 38 being connected to said lever 36, whereby the rotation of the stem 9 will operate said rod 38, substantially as described.

CHARLES F. ELMES.

Witnesses:
JOHN L. JACKSON,
A. H. ADAMS.